United States Patent [19]

Guthart

[11] 3,710,134
[45] Jan. 9, 1973

[54] POWER SUPPLY FOR ALARM SYSTEM
[75] Inventor: Leo A. Guthart, Old Westbury, N.Y.
[73] Assignee: Alarm Device Manufacturing Company, Syosset, Long Island, N.Y.
[22] Filed: May 10, 1971
[21] Appl. No.: 141,660

[52] U.S. Cl. .................................. 307/66, 320/21
[51] Int. Cl. .............................................. H02j 7/00
[58] Field of Search .............. 320/13, 21; 307/66, 64;
340/333; 307/112, 125

[56] References Cited

UNITED STATES PATENTS 3,603,973   9/1971   Hough ............................ 307/66 X Primary Examiner—Herman J. Hohauser
Attorney—Sommers & Sommers

[57] ABSTRACT

A power supply for alarm systems. Under normal power conditions the disclosed circuit rectifies A.C. house current and provides 6 volt D.C. power to the alarm protective and signal circuits. Rechargeable batteries are disposed in the supply circuit so as to be kept at full potential by a constant trickle charge, and if house current fails the batteries are automatically available to power the alarm system. Intermittent switching and delay means are provided in the circuit and function such that if the batteries are placed under load, as by ringing an alarm bell, the batteries are intermittently removed from the load circuit thereby prolonging their life and the period during which alerting by the alarm system is possible.

7 Claims, 1 Drawing Figure

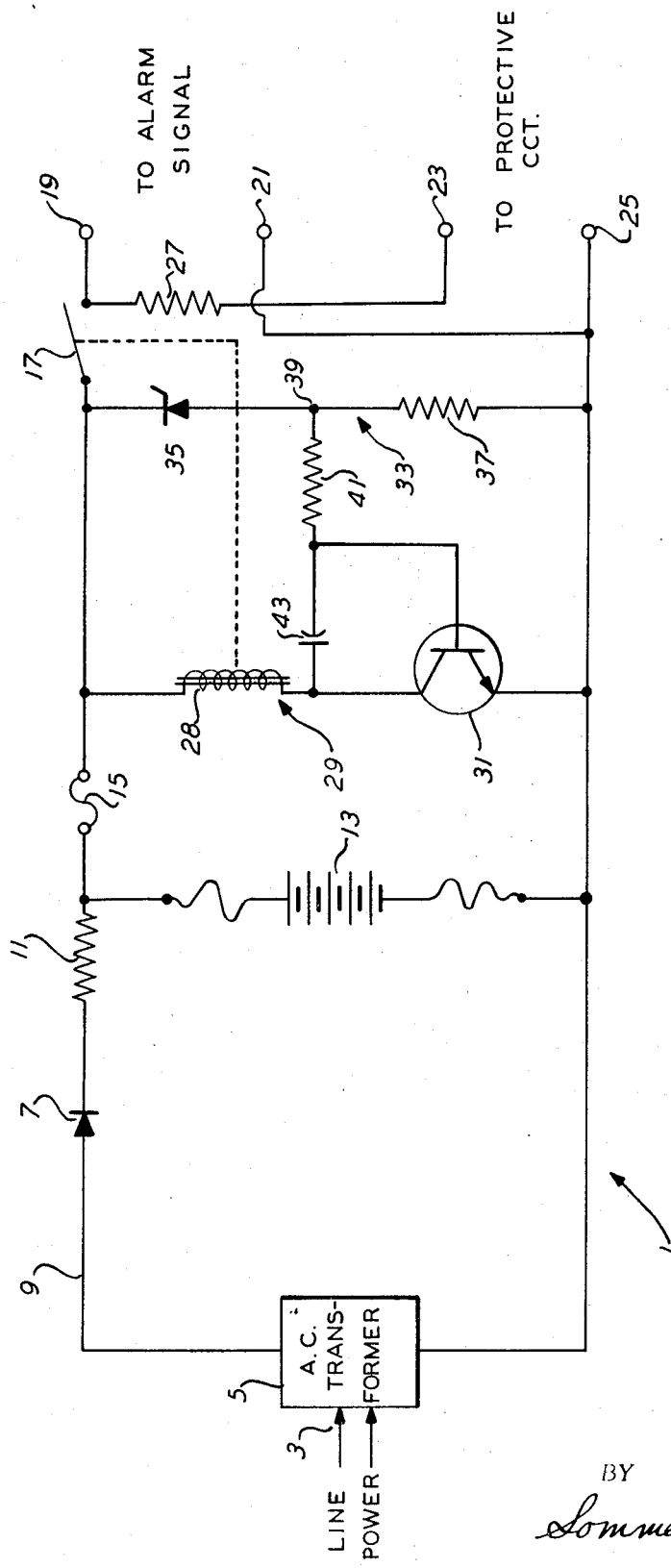

POWER SUPPLY FOR ALARM SYSTEM

BACKGROUND OF INVENTION

This invention relates generally to alarm systems useful in protecting home or business premises, and more specifically relates to such systems of the type provided with battery back-up means for taking over system power functions in the event of line power failure.

Alarm systems of the type intended to provide protection for home or business premises, commonly are designed in such a manner that alarm operation may always be effected from batteries disposed in the system — even in those instances where line power is utilized as the "normal" energizing source. The reason for such arrangement is two-fold: Firstly, protection must be continued during periods of general power failure — e.g. due to regional blackouts or the like. Secondly, it is a common practice among professional burglars to attempt prior to entry into a building, to disrupt the line power to alarm systems, in the hope that the systems will be thus rendered incapable of signaling their entry.

Aside from the known problem of maintaining the auxiliary batteries at a peak level of performance for sustained periods of non-use, an even more pressing problem occurs upon the batteries being called upon to power the alarm. In particular when the batteries are thus placed under the full load of ringing a burglar alarm bell or other alerting device, they will have a limited life, and when the batteries drop sufficiently low, if the line power has not been restored, the batteries will no longer be able to activate the alerting device. In consequence following the initial limited period of alarm operation, the premise may be left completely unprotected.

In accordance with the foregoing, it may be regarded as an object of the present invention, to provide a power supply for operating burglar alarm systems, which under normal line power conditions rectifies A.C. house current, steps the voltage down to low operating levels, and maintains via constant trickle charging, the full potential of a set of rechargeable batteries disposed in the unit.

It is a further object of the invention, to provide a power supply for operating burglar alarm systems, which includes a set of rechargeable batteries disposed to take over alarm functions in the event of line power failure, and which further includes means for extending the useful life of the batteries subsequent to being placed under load, thereby prolonging the period during which battery-powered protection is afforded by the alarm system.

SUMMARY OF INVENTION

Now in accordance with the present invention, the foregoing objects, and others as will become apparent in the course of the ensuing specification, are achieved in a power supply including circuitry which under normal power conditions rectifies the A.C. line current and provides 6 volt D.C. power to the alarm protective and signaling circuits and to a set of rechargeable batteries disposed in the supply circuit so as to be kept at full potential by a constant trickle charge. In the event of line power failure or intentional disruption of such power, the said batteries are automatically available to power the alarm system. Intermittent switching and delay means are provided in the circuit, and function such that if the batteries are placed under load, as for example by ringing an alarm bell, the batteries are intermittently removed from the load circuit, thereby prolonging the useful life of the batteries and extending the period during which battery-powered protection by the alarm system is possible.

BRIEF DESCRIPTION OF DRAWING

The invention is illustrated, by way of example, in the drawing appended hereto, in which:

The FIGURE is an electrical schematic diagram of a power supply in accordance with the invention.

DESCRIPTION OF PREFERRED EMBODIMENT

In the FIGURE a power supply 1 is illustrated, which will normally be employed as part of a burglar alarm system intended for use in protecting home, business or similar premises. Supply 1 is connected to normal 117 volt A.C. line power 3 through a standard step-down transformer 5 which reduces the line potential to approximately 12 volts A.C. A single diode 7 is seen to be connected in the transformer lead 9 and provides half-wave rectification to, in turn, provide via resistor 11 a constant trickle current for charging a set of rechargeable nickel-cadmium batteries 13 connected across the rectifier output.

Because of the aforementioned constant trickle-charging, batteries 13 are always maintained at a substantially full charge, and in turn provide power for operation of the alarm system. Such power, typically at a potential of about 6 volts, is provided to the alarm system via a fuse 15, and a switch 17. While the details of the alarm system itself are not generally significant to the present invention, it is seen that a pair of parallel outputs 19, 21 and 23, 25 are available from supply 1. Outputs 23, 25 provide power to the protective circuit of such system, and outputs 19, 21 power to the alarm device, as for example a bell the operation of which is enabled by the said protective circuit. A dropping resistor 27 connected between parallel outputs 19 and 23 adjusts the supply potential to the requirements of the protective circuit.

Switch 17 is seen to be of the solenoid-operated variety, and the coil 28 for such solenoid is disposed in a circuit branch 29 which also includes in series a transistor 31. A second circuit branch 33 is in parallel with branch 29 and includes a reference diode 35, such as a Zener, and a resistor 37 in series therewith. The point 39 between diode 35 and resistor 37 is coupled to the base of transistor 31 through resistor 41 and capacitor 43 connected across the base — collector circuit.

Under normal operating conditions, that is with the line current operating and batteries 13 at their full potential, transistor 31 is biased as to be conducting, and in consequence current flowing through branch 29 maintains switch 17 in a "normally" closed position. Should line power fail or be intentionally disrupted the batteries 13 are fully available for powering the aforementioned protective and alarm device circuits. Assuming that such failure has occurred and that furthermore a substantial load is placed upon the batteries by enablement of the signalling device at terminals 19, 21 — e.g. a ringing bell, the batteries potential begins to drop.

In accordance with a feature of the invention, upon the dropping battery potential reaching a predetermined point, the potential at point 39 in turn drops sufficiently to turn-off transistor 31. With current now no longer flowing through coil 28, switch 17 opens and the batteries are withdrawn from the powering circuit. Transistor 31 thereupon remains in an OFF condition for a delay period in accordance with the discharge of characteristics of the RC circuit formed by capacitor 43 and resistors 41 and 37. Upon sufficient discharge of the capacitor and assuming sufficient potential available at batteries 13 (which have regained potential during the "rest" period) transistor 31 is turned on and switch 17 re-closed.

It is thus seen that the sequence of events described above leads upon power failure and alarm system activation, to an initial period of alarm device signalling, such as a ringing of an alarm bell, followed by intermittent on and off operation of the said device. By proper choice of the parameters of the power supply, one may thus typically provide, for example, an initial ringing period of sufficient duration as to frighten the would-be burglar and otherwise attract attention, and thereafter (since the batteries recover in part their potential during "rest" periods) an intermittent sounding of the alarm for a total period which far exceeds that which would be available were intermittent operation not used.

While the present invention has been particularly described in terms of a specific embodiment thereof, it will be understood in view of the present disclosure, that numerous modifications upon the invention are now enabled to those skilled in the art, which variations, in propriety, yet reside within the true scope of the instant teaching. Accordingly the invention is to be broadly construed and limited only by the scope and spirit of the claims now appended hereto.

I claim:

1. A power supply for a burglar alarm system, comprising in combination:
    input circuit means connectable to line power at the premises protected by said system;
    voltage reduction means for reducing the potential of said line power;
    means for rectifying the reduced potential line current;
    a set of rechargeable batteries connected to receive constant trickle charging from said rectifying means;
    output circuit means for powering said alarm system, connectable to receive the outputs of said rechargeable batteries and said rectifying means; and
    switch operating and delay circuit means connected to sense the potential of said batteries upon said batteries being placed under substantial load by line power failure and subsequent activation of alarm signalling devices, to provide power for intermittent on and off periods, thereby extending the functional life of the powering batteries and the period during which said alarm system may provide battery-powered protection.

2. Apparatus in accordance with claim 1, wherein normally closed switch means are connected between said output circuit means and the outputs of said batteries and said rectifying means, and are opened by said switch means for a delay period upon said potential dropping below a predetermined level.

3. Apparatus in accordance with claim 2, wherein said switch means is solonoid operated, and said switch operating and delay circuit means includes a first branch connected across the outputs from said batteries and said rectifier means, said branch having in series a normally on transistor switching means and the coil for said solonoid, said transistor switching means being turned off in response said sensed potential drop at said batteries.

4. Apparatus in accordance with claim 3, wherein said switch operating and delay circuit means further includes a second branch connected in parallel with said first branch for sensing said potential drops, said second branch having a voltage reference diode and resistor in series therewith, voltage drops in said branch being coupled to said transistor switching means to effect said turn-off.

5. Apparatus in accordance with claim 4, further including RC delay circuit means at said transistor switching means, for delaying turn-on of said switching means for a predetermined period following turn-off.

6. Apparatus in accordance with claim 1 wherein said rectifying means comprises a single diode connected between one side of said transformer means and said rechargeable batteries.

7. Apparatus in accordance with claim 6, wherein said batteries are of the nickel-cadmium type.

* * * * *